May 8, 1945.   R. DEANE   2,375,404
DYNAMIC TORQUE COMPENSATOR
Filed Aug. 31, 1942   2 Sheets-Sheet 1
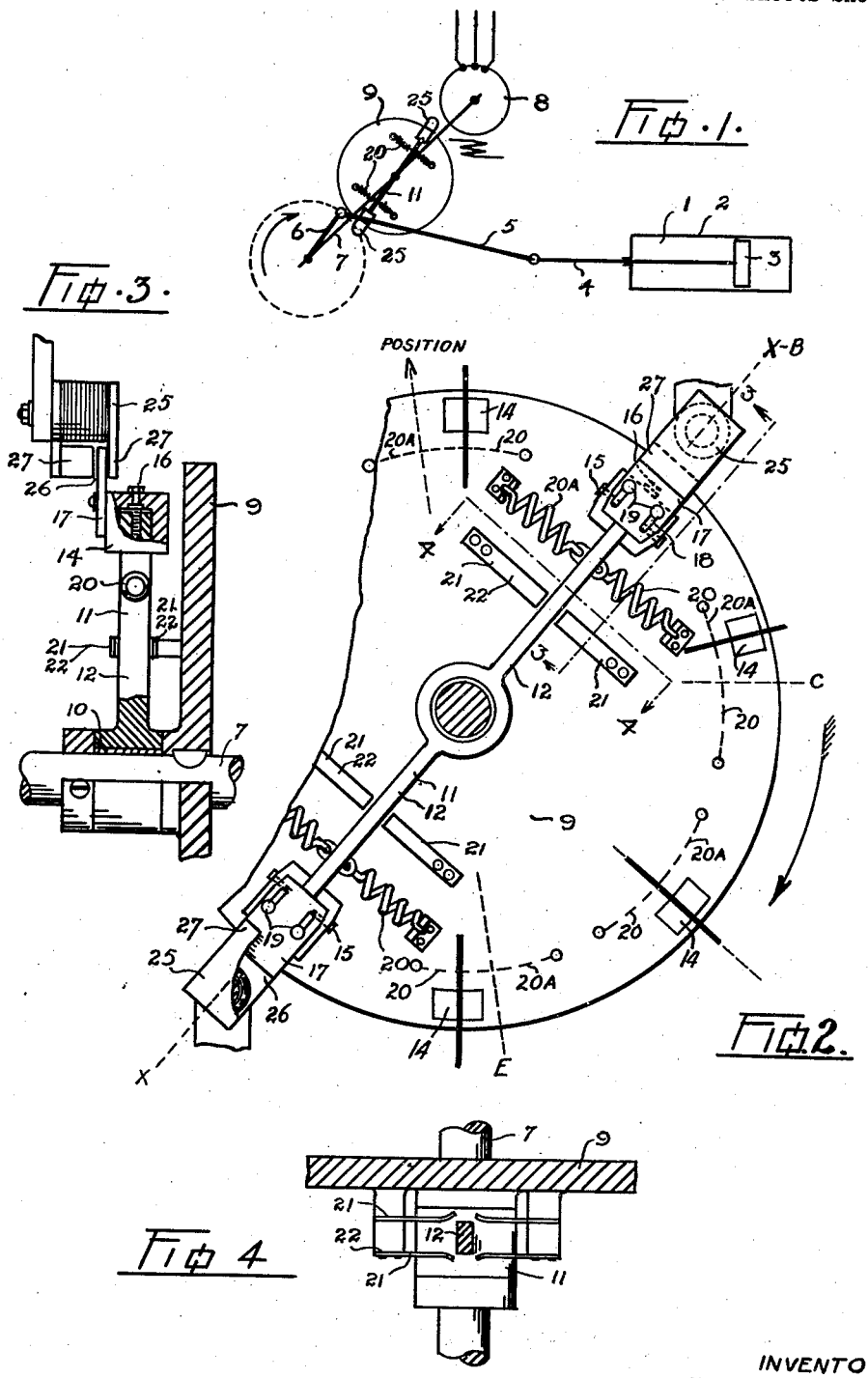
INVENTOR
RICHARD DEANE
Ernest E Parker
ATTORNEY.

Patented May 8, 1945

2,375,404

UNITED STATES PATENT OFFICE 2,375,404

DYNAMIC TORQUE COMPENSATOR

Richard Deane, South Slocan, British Columbia, Canada

Application August 31, 1942, Serial No. 456,781

10 Claims. (Cl. 172—120)

My invention relates to improvements in dynamic torque compensators, which are particularly adapted for use on machines having pulsating torque characteristics, and operating at constant speed such as reciprocating machines connected to synchronous motors or generators, or to such combinations as Diesel, gasoline, steam or other prime movers driving an alternator.

The objects of the invention are to provide means for exciting an undamped tuned oscillator in such a manner that the forces developed by the oscillator oppose and neutralize, at all angular positions of the shaft, the undesirable torque pulsations inherent in operation of the machine. The excitation and thereby the amplitude of the oscillator would be controlled automatically to the correct value for the load condition under which the machine is operating. This correct value being taken as point of minimum pulsation in the electrical power flow of the motor or generator. By thus smoothing out the power flow the efficiency and stability of the electrical machine are materially improved and also by neutralizing the torque pulsations the necessity for a large flywheel is greatly reduced.

The invention consists of a compensator adapted for mounting upon a machine shaft to rotate therewith, which compensator includes a tuned oscillator having weights, arms and resilient elements arranged to have a natural frequency of vibration equal to the undesirable torque pulsations in the shaft.

Referring to the drawings—

Fig. 1 is a diagrammatic view of a direct driven double acting air compressor showing the application of the invention.

Fig. 2 is an elevational view of the oscillator.

Fig. 3 is a sectional view showing a vane passing through the gap of one of the electromagnets.

Fig. 4 is a sectional view taken on the line 4—4 of Figure 2.

In the drawings like characters of reference indicate corresponding parts in each figure.

Figure 5:
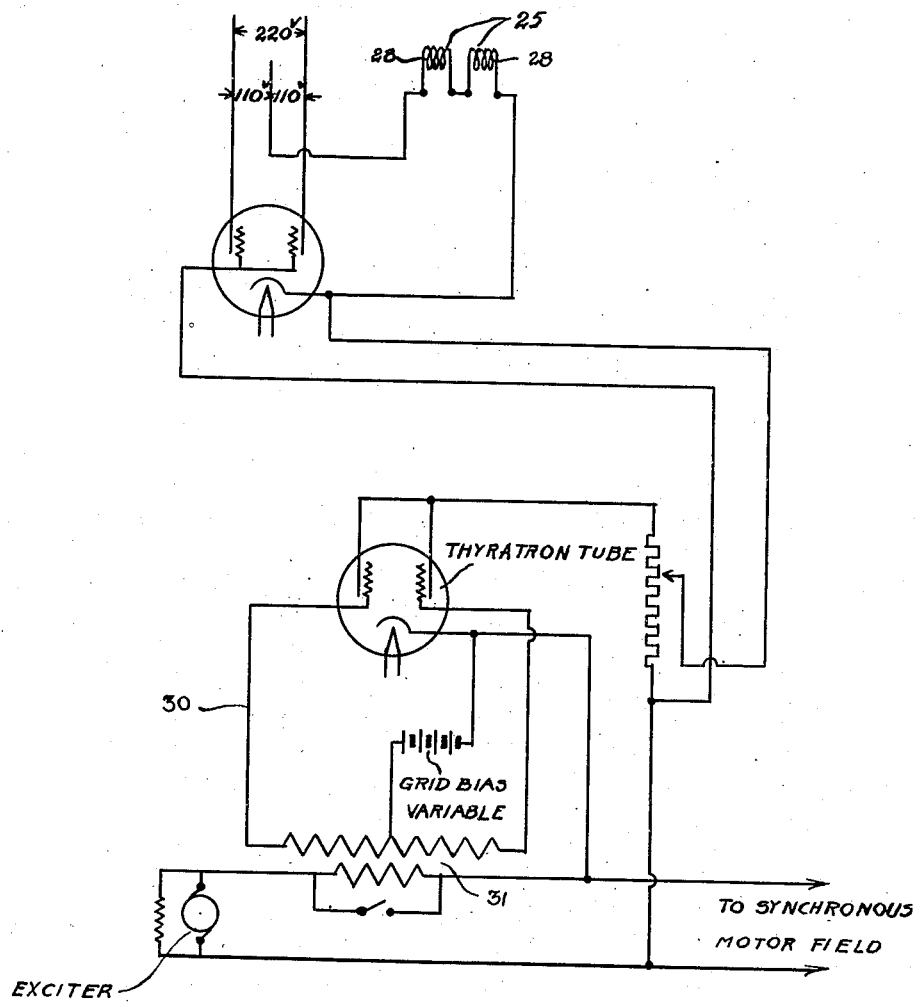
Fig. 5 is a diagram of an amplifying circuit suitable for controlling the operation of the invention.

I have chosen as an example to which the invention herein described is applied, a double acting single cylinder air compressor direct driven by a three phase synchronous motor. Such a compressor is subject to undesirable alternating forces which are inherent in the operation due to torque variation according to crank position, load, etc., all of which cause torsional oscillations of a more or less serious or objectionable nature, these torsional oscillations of the field structure relative to the revolving magnetic field set up by the armature cause undesirable pulsations both in the field current and in the armature current which tend to cause the motor to swing out of step.

The numeral 1 indicates a compressor having a single cylinder 2 fitted with a piston 3, piston rod 4 and connecting rod 5 which is driven by a crank 6 on a driven shaft 7. The shaft 7 is directly driven by a synchronous motor 8 and is fitted with a flywheel 9. The flywheel 9 is provided with a boss or bearing 10 upon which an oscillator 11 is rockingly mounted.

The oscillator here shown consists of a pair of radial arms 12 spaced 180 degrees apart. At the outer end of each oscillator arm a weight 14 of suitable size is mounted. For the purpose of tuning the oscillator the weights may be slotted, as indicated in dotted lines in Figure 2, and so fitted to the arms 12 as to permit them to be moved towards or away from the axis of the shaft 7 and be held in set position by a transverse bolt 15. A radially fitted tuning screw 16 is fitted to each weight for fine tuning. Mounted upon each weight 14 is a metal vane 17 which is slotted vertically as at 18 to receive fastening screws 19 and permit of radial adjustment of the vane with respect to the oscillator arm to which it is fitted.

The oscillator 11 is resiliently anchored to the flywheel by two pairs of springs each consisting of a leading spring 20 and a following spring 20A which tend to hold said oscillator in line with the crank 6 and to permit it to swing under stress in opposite directions. In order to prevent vibration in the oscillator beyond a predetermined amplitude, pairs of damping jaws 21 are mounted upon the flywheel, these jaws consist of pairs of spaced leaf springs 22 having their free ends flared outwardly as at 23 to allow the oscillator arms 12 when swinging beyond a predetermined distance from their neutral or mid position to enter between said pair of springs and frictionally engage them. It will be understood that the mass of the arms 12, the weights 14, the position of said weights, and the stiffness of the springs 20 and 20A have a very definite relationship to each other, that is with the rotor clamped solidly to the stator and the weights 14 displaced from their neutral position and released, the resulting frequency of the oscillations of the weights must equal the frequency in cycles per second of the disturbing torque pulsations of the machine to which the compensator is fitted.

Suitably supported adjacent the periphery of the flywheel 9 is a pair of electromagnets 25 each having a gap 26 between their pole pieces 27. These electromagnets are aligned about the flywheel substantially opposite to the mean torque positions X of the shaft 7. The windings 28 of the electromagnets 25 are connected in series with a thermionic amplifying circuit 30 of any suitable type which may be as indicated in Figure 5 in which the pick up transformer 31 is cut in on the synchronous motor exciter to field circuit.

The function of the amplifying and control circuit is to energize the electromagnets 25 in proportion to the amplitude of the pulsations in the field circuit which will cause a proportionate drag on the oscillator weights as its vanes 17 pass through the gaps 26 of the magnets. When the amplifying circuit is properly tuned the drag on the vanes 17 will retard the oscillator weights, stressing the springs 20 and 20A and due to the magnification factor introduced by using a correctly tuned oscillator the compensating forces will be materially greater than the drag forces produced by the magnets upon the vanes, thus materially reducing the peaks on the current imput curve and evening out the current flow generally. In other words the control circuit by energizing the magnets 25 will cause a dragging force to be applied to the weights at such a point in their cycle of oscillation that their amplitude of swing will be increased slightly with each revolution, until the forces applied to the rotor by the springs 20 compensate the pulsating torque caused by the piston of the compressor. As the forces applied to the rotor approach the compensating point above referred to, the pulsations in the field current will be reduced and through the control circuit the excitation of the magnets will also be reduced, so as not to further increase the amplitude of swing of the weights, but merely to maintain their oscillation at such an amplitude as will produce the correct compensating forces on the rotor.

The function above described is diagrammatically illustrated in Figure 2 where position A is the point where compressor torque is at its maximum value, the weight 14 is in extreme forward position and the springs 20 and 20A are exerting a strong forward torque, thus assisting the motor to turn the compressor. At position B the compressor torque has decreased to approximately its mean value. The weight 14 is in mid position and the springs are applying no net torque to the shaft, the weight is moving backwards relative to the shaft and the retarding force due to the magnet 25 is also in this direction (due to the weight moving forward relative to the magnet) therefore energy will be put into the weight spring oscillating system as it passes the magnet 25. This will tend to increase the amplitude of swing of the weight 14 at each successive passing of the magnet 25. At position C compressor torque is at its minimum value. Oscillator weight 14 is in extreme backward position and springs are exerting a strong backward torque acting as a load on the motor. At position D compressor torque has increased to approximately its mean value. Weight 14 is in mid position and springs apply no net torque to shaft. The velocity of the arm obviously advances it relatively to the shaft as shown in position E which is equivalent to position A, thus completing the torque cycle.

What I claim as my invention is:

1. A dynamic torque compensator adapted to be mounted on a synchronous motor or generator shaft having a maximum torque and a mean torque position, said motor having field windings and an exciter said compensator comprising an oscillator having radial arms rockingly mounted upon the shaft, spring means between the oscillator and the shaft tending to retain said arms in a predetermined position relative to said shaft, and means governed by fluctuations in the direct current field supply for retarding the radial arms when one of said arms passes a mean torque position of the shaft.

2. A dynamic torque compensator adapted to be mounted on a shaft driven by a synchronous motor, said shaft having a maximum and a mean torque position, said compensator comprising a pair of radial arms rockingly mounted upon the shaft, springs normally tending to hold the arms in a predetermined position relative to the shaft, a metal vane on one of the arms, an electromagnet secured in position within the path of the metal vane whereby said vane cuts the lines of force of the magnet in passing, and means for exciting the magnet in proportion with the fluctuations in current flow between the exciter and field of the synchronous motor.

3. A dynamic torque compensator adapted to be mounted on a shaft having a fluctuating torque varying regularly with its angular position and being driven by a synchronous motor having field windings and an exciter, said shaft having a maximum, minimum and mean torque positions, said compensator comprising a pair of radial arms rockingly mounted upon the shaft, springs normally tending to hold the arms in a predetermined position relative to the shaft, a metal vane on one of the arms, an electromagnet secured in position within the path of the metal vane whereby said metal vane cuts the lines of force of the magnet in passing, and means for exciting the magnet with direct current from the synchronous motor field supply, the excitation of said magnet being in magnitude in proportion to the fluctuations in the armature current input to said motor.

4. A dynamic torque compensator adapted to be mounted on a shaft driven by a synchronous motor having field windings and an exciter, said shaft having a maximum and a mean torque position, said compensator comprising a pair of radial arms rockingly mounted upon the shaft, springs normally tending to hold the arms in a predetermined position relative to the shaft, a metal vane on one of the arms, an electromagnet secured in position within the path of the metal vane whereby said metal vane cuts the lines of force of the magnet in passing, and means for exciting the magnet in amplitude with the fluctuations of the direct current flow between the exciter and the field windings.

5. A dynamic torque compensator adapted to be mounted on a shaft driven by a synchronous motor, said shaft having a maximum and a mean torque position, said compensator comprising a pair of radial arms rockingly mounted upon the shaft, springs normally tending to hold the arms in a predetermined position relative to the shaft, a metal vane on one of the arms, an electromagnet secured in position within the path of the metal vane whereby said metal vane cuts the lines of force of the magnet in passing, and means for exciting the magnet in proportion with the fluctuations in current flow between the exciter and field of the synchronous motor and means for varying the position of the metal vane and the magnet relative to each other in a direction radial to the arms to control the oscillator.

6. A dynamic torque compensator adapted to be mounted upon a rotatable shaft having regular maximum and minimum torque positions, said compensator comprising an oscillator rotatable with the shaft, resilient means supported from the shaft tending to hold the oscillator in a predetermined position relative to the shaft, a stationary electromagnet adapted to retard the oscillator as one of its parts passes a mean torque position, means for supplying current to the magnet and electronic means for increasing said current in proportion to the torque fluctuations as the oscillator part approaches the mean torque position.

7. A dynamic torque compensator adapted to be mounted upon a shaft having positions of maximum and minimum torque, said compensator having opposed arms, spring means tending to hold the arms in a predetermined position relative to the shaft, an electromagnet mounted in fixed position and having a gap through which the outer end of one of the arms passes as the shaft rotates a current supply to the magnet, and means to control the current to the electromagnet in proportion to the torque fluctuations of the shaft.

8. A dynamic torque compensator adapted to be mounted upon a shaft having positions of maximum and minimum torque, said compensator having opposed arms, a weight adjacent the outer end of each arm, said weights being adjustable lengthwise of the arms, spring means tending to hold the arms in a predetermined position relative to the shaft, an electromagnet mounted in fixed position and having a gap through which the outer end of one of the arms passes as the shaft rotates, and means for supplying current to the electromagnet in proportion to the torque fluctuations of the shaft to retard the weights and impose resistance to rotation of the compensator through said spring means.

9. A dynamic torque compensator adapted to be mounted upon a shaft having positions of maximum and minimum torque, said compensator having opposed arms a leading spring and a following spring, spring means tending to hold the arms in a predetermined position relative to the shaft and means operating in response to torque fluctuations in the shaft for retarding the arms relative to the shaft as said shaft approaches its mean torque position thereby stretching the leading spring and causing the arm when the mean torque position is passed to deliver its energy through some of the springs to urge the shaft in a forward direction urging the arms to stress the spring means in proportion to said fluctuations and in a direction counter to that normally set up by the shaft.

10. A dynamic torque compensator adapted to be mounted upon a shaft having positions of maximum and minimum torque, said compensator having opposed arms, a weight adjacent the outer end of each arm, said weights being adjustable lengthwise of the arms, a leading spring and a following spring tending to hold the arms in a predetermined position relative to the shaft, and means operating in response to torque fluctuations in the shaft for retarding the arms relative to the shaft as said shaft approaches a mean torque position and in proportion to said torque thereby stretching the leading spring and causing the weights when the mean torque position is passed to transfer its energy through some of said springs to urge the shaft in a forward direction.

RICHARD DEANE.